US00RE46766E

(19) United States
(12) Reissued Patent
Rohana et al.

(10) Patent Number: US RE46,766 E
(45) Date of Reissued Patent: Mar. 27, 2018

(54) CACHE PRE-FETCH ARCHITECTURE AND METHOD

(71) Applicant: Marvell Israel (M.I.S.L) Ltd., Yokneam (IL)

(72) Inventors: Tarek Rohana, Santa Clara, CA (US); Adi Habusha, Moshav Alonee-Abba (IL); Gil Stoler, Nofit (IL)

(73) Assignee: Marvell Israel (M.I.S.L.) Ltd., Yokneam (IL)

(21) Appl. No.: 14/788,122

(22) Filed: Jun. 30, 2015

Related U.S. Patent Documents

Reissue of:
(64) Patent No.: 8,484,421
Issued: Jul. 9, 2013
Appl. No.: 12/624,242
Filed: Nov. 23, 2009

U.S. Applications:
(60) Provisional application No. 61/117,718, filed on Nov. 25, 2008.

(51) Int. Cl.

| | |
|---|---|
| ***G06F 13/00*** | (2006.01) |
| ***G06F 9/30*** | (2006.01) |
| ***G06F 12/0855*** | (2016.01) |
| ***G06F 12/0862*** | (2016.01) |
| ***G06F 9/38*** | (2018.01) |

(52) U.S. Cl.
CPC ..... *G06F 12/0857* (2013.01); *G06F 9/3802* (2013.01); *G06F 9/3814* (2013.01); *G06F 12/0862* (2013.01)

(58) Field of Classification Search
CPC ..... G06F 12/0862; G06F 9/3802; G06F 12/0857; G06F 9/3814; G06F 9/383
USPC ..... 711/118, 123, 131, 137, 154, 167, 168, 711/169; 712/206, 207
See application file for complete search history.

(56) References Cited

U.S. PATENT DOCUMENTS

| | | | | |
|---|---|---|---|---|
| 4,190,885 | A | 2/1980 | Joyce et al. | |
| 5,386,503 | A | 1/1995 | Staggs et al. | |
| 5,459,840 | A | 10/1995 | Isfeld et al. | |
| 5,623,627 | A * | 4/1997 | Witt | 711/122 |
| 5,625,793 | A | 4/1997 | Mirza | |
| 5,689,670 | A * | 11/1997 | Luk | 712/207 |
| 5,692,152 | A * | 11/1997 | Cohen | G06F 12/0897 711/122 |
| 6,012,134 | A * | 1/2000 | McInerney et al. | 711/207 |
| 6,157,981 | A | 12/2000 | Blaner et al. | |
| 6,546,461 | B1 * | 4/2003 | Au et al. | 711/131 |
| 6,604,140 | B1 * | 8/2003 | Beck | G06F 9/5055 709/201 |
| 6,604,174 | B1 * | 8/2003 | Dean et al. | 711/131 |
| 6,754,779 | B1 * | 6/2004 | Magro | G06F 12/0862 710/22 |
| 6,918,009 | B1 * | 7/2005 | Sato et al. | 711/137 |
| 6,928,451 | B2 * | 8/2005 | Mogi et al. | 707/718 |
| 7,209,996 | B2 | 4/2007 | Kohn et al. | |

(Continued)

*Primary Examiner* — Behzad Peikari

(57) ABSTRACT

Embodiments of the present disclosure provide a system on a chip (SOC) comprising a processing core, and a cache including a cache instruction port, a cache data port, and a port utilization circuitry configured to selectively fetch instructions through the cache instruction port and selectively pre-fetch instructions through the cache data port. Other embodiments are also described and claimed.

43 Claims, 9 Drawing Sheets

(56) References Cited

U.S. PATENT DOCUMENTS

| | | | | |
|---|---|---|---|---|
| 7,240,160 | B1 | 7/2007 | Hetherington et al. | |
| 7,574,548 | B2 | 8/2009 | Drapala et al. | |
| 2001/0005871 | A1 | 6/2001 | Shimoda et al. | |
| 2004/0260872 | A1 | 12/2004 | Depta | |
| 2008/0046736 | A1 | 2/2008 | Arimilli et al. | |
| 2008/0313328 | A1* | 12/2008 | Dahlin et al. | 709/224 |

* cited by examiner

CACHE PRE-FETCH ARCHITECTURE AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

[The present application claims priority to U.S. Provisional Patent Application No. 61/117,718 filed Nov. 25, 2008, entitled "Method for Implementing L2 Pre-Fetch Capability Using Existing BIU Ports," the entire specification of which is hereby incorporated by reference in its entirety for all purposes, except for those sections, if any, that are inconsistent with this specification.] *The present disclosure is a Broadening Reissue of U.S. Pat. No. 8,484,421, issued Jul. 9, 2013, which claims priority to U.S. Provisional Patent Application No. 61/117,718, filed Nov. 25, 2008, which are incorporated herein by reference.*

TECHNICAL FIELD

Embodiments of the present disclosure relate to cache memory, and more particularly, to cache pre-fetch architecture and method.

BACKGROUND

A system on a chip (SOC) generally includes at least one processing core, which generally is operatively coupled to a level 2 (L2) memory cache. A cache in a SOC typically needs to fetch, from a memory, current instructions and current data (as and when required by the processing core, in case such current instructions and current data are, for example, not already cached in the cache and/or is dirty), as well as pre-fetch instructions and pre-fetch data corresponding to instructions and data that are likely to be needed, by the processing core, in a forthcoming operation. In conventional SOC architectures each of the current instructions, current data, pre-fetch instructions and pre-fetch data are communicated between the processor and the cache, such as an L2 cache, via dedicated ports.

The description in this section is related art, and does not necessarily include information disclosed under 37 C.F.R. 1.97 and 37 C.F.R. 1.98. Unless specifically denoted as prior art, it is not admitted that any description of related art is prior art.

SUMMARY

In an embodiment, the present disclosure provides a system on a chip (SOC) comprising a processing core; and a cache including a cache instruction port; a cache data port; and a port utilization circuitry configured to selectively fetch instructions through the cache instruction port and selectively pre-fetch instructions through the cache data port. The port utilization circuitry is further configured to selectively fetch data through the cache data port and selectively pre-fetch data through the cache instructions port. The port utilization circuitry is configured to issue a first request for fetching a first line of instruction, the first request transmitted through the cache instructions port; determine that the cache data port is not currently being used to fetch data; and issue, based on determining that the cache data port is not currently being used to fetch data, a second request for pre-fetching a second line of instruction, the second request transmitted through the cache data port. The port utilization circuitry is further configured to issue a third request for fetching a first line of data, the third request transmitted through the cache data port; determine that the cache instructions port is not currently being used to fetch instructions; and issue, based on determining that the cache instructions port is not currently being used to fetch instructions, a fourth request for pre-fetching a second line of data, the fourth request transmitted through the cache instructions port. The SOC further comprises a bridge module configured to transmit the first request for fetching the first line of instruction from the cache instruction port to a memory; receive, from the memory, the first line of instruction in response to transmitting the first request to the memory; and transmit the received first line of instruction to the cache instruction port and the processing core. The bridge module is configured to transmit the second request for pre-fetching the second line of instruction from the cache data port to the memory; receive, from the memory, the second line of instruction in response to transmitting the second request to the memory; transmit the received second line of instruction to the cache data port; and refrain from transmitting the second line of instruction to the processing core. The bridge module includes a bridge instruction module and a bridge data module, wherein the bridge instruction module is operatively coupled to the cache instruction port and is configured to transmit the first request for fetching the first line of instruction from the cache instruction port to a memory; receive, from the memory, the first line of instruction in response to transmitting the first request to the memory; and transmit the received first line of instruction to the cache instruction port and the processing core. The bridge data module is operatively coupled to the cache data port and is configured to transmit the second request for pre-fetching the second line of instruction from the cache data port to the memory; receive, from the memory, the second line of instruction in response to transmitting the second request to the memory; transmit the received second line of instruction to the cache data port; and refrain from transmitting the second line of instruction to the processing core.

In an embodiment, the port utilization circuitry comprises a cache instruction logic module including an instruction read port and an instruction pre-fetch port; a cache data logic module including a data read port and a data pre-fetch port; a first multiplexer module configured to selectively connect the instruction read port and the data pre-fetch port to the cache instruction port; and a second multiplexer module configured to selectively connect the data read port and the instruction fetch port to the cache data port. The cache instruction logic module is configured to issue a first request for fetching a first line of instruction, the first request transmitted through the instruction read port, the first multiplexer, and the cache instruction port; determine, in response to issuing the first request, that the cache data port is not currently being used by the cache data logic module; and issue, based on determining that the cache data port is not currently being used by the cache data logic module, a second request for pre-fetching a second line of instruction, the second request transmitted through the instruction pre-fetch port, the second multiplexer, and the cache data port. The cache instruction logic module is configured to issue the first request for fetching the first line of instruction based on receiving a request from the processing core for instructions included in the first line of instruction; anticipate the processing core will request instructions included in the second line of instruction, based at least in part on receiving the request for instructions from the processing core; and issue the second request for pre-fetching the second line of instruction based at least in part on said anticipation. The cache data logic module is configured to receive a request for data from the processing core; issue a third request for fetching a first line of data such that the data requested by the processing core is included in the first line of data, wherein the third request is transmitted through the data read port, the second multiplexer, and the cache data port; determine that the cache instruction port is not currently being used by the cache instruction logic module; and issue, based on determining that the cache instruction port is not currently being used by the cache instruction logic module, a fourth request for pre-fetching a second line of data, the fourth request transmitted through the data pre-fetch port, the first multiplexer, and the cache instruction port.

There is also provided a method for operating a system on a chip (SOC) comprising a processing core and a cache, the cache including a cache instruction port and a cache data port, the method comprising issuing a first request for fetching a first line of instruction through the cache instruction port; and issuing a second request for pre-fetching a second line of instruction through the cache data port. Issuing the second request further comprises determining, in response to issuing the first request, that the cache data port is not currently being used by the cache; and issuing the second request based on determining that the cache data port is not currently being used by the cache. The cache includes a cache instruction logic module, a cache data logic module, a first multiplexer and a second multiplexer, wherein the cache instruction logic module includes an instruction read port and an instruction pre-fetch port, and wherein the cache data logic module includes a data read port and a data pre-fetch port; wherein issuing the first request further comprises issuing the first request, by the cache instruction logic module, through the instruction read port, the first multiplexer and the cache instruction port; and wherein issuing the second request further comprises issuing the second request, by the cache instruction logic module, through the instruction pre-fetch port, the second multiplexer and the cache data port.

The method further comprises issuing a third request for fetching a first line of data through the cache data port; and issuing a fourth request for pre-fetching a second line of data through the cache instruction port. The SOC further includes a bridge module, the method further comprising transmitting, by the bridge module, the first request for fetching the first line of instruction from the cache instruction port to a memory; receiving, by the bridge module from the memory, the first line of instruction in response to transmitting the first request to the memory; and transmitting the received first line of instruction to the cache instruction port and the processing core.

The SOC further includes a bridge module, the method further comprising transmitting, by the bridge module, the second request for pre-fetching the second line of instruction from the cache data port to a memory; receiving, by the bridge module from the memory, the second line of instruction in response to transmitting the second request to the memory; and transmitting, by the bridge module, the received second line of instruction to the cache data port. The method further comprises refraining, by the bridge module, from transmitting the second line of instruction to the processing core. The method further comprises issuing the first request and the second request substantially simultaneously or in an overlapping manner.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of the disclosure are illustrated by way of example and not by way of limitation in the figures of the accompanying drawings.

[FIGS. 5 and 6]

DETAILED DESCRIPTION

Figure 1:
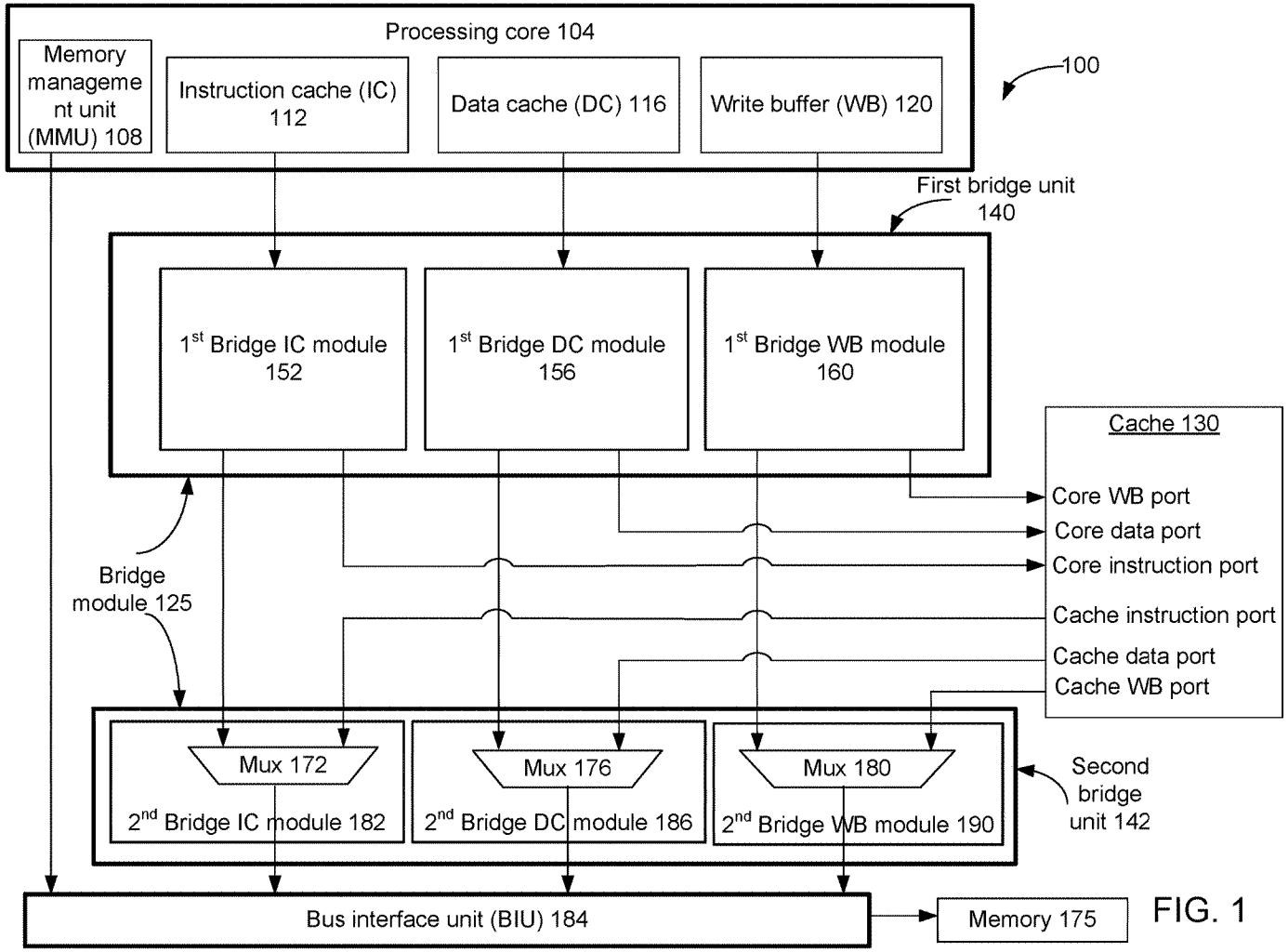
[FIG. 1a] *FIG. 1* schematically illustrates a system on a chip (SOC), in accordance with an embodiment of the present disclosure.
[FIG. 1b] *FIG. 2* schematically illustrates another SOC, in accordance with an embodiment of the present disclosure.

[FIG. 1a] *FIG. 1* schematically illustrates a highly simplified system on a chip (SOC) 100, in accordance with an embodiment of the present disclosure. The SOC 100 includes one or more processing cores, including processing core 104. Only one processing core is shown for the sake of simplicity and to avoid obfuscating teaching principles of the present disclosure. The SOC 100 also includes a bus interface unit (BIU) 184 configured to operatively couple one or more components of the processing core 104 with one or more other components of the SOC 100.

The processing core 104 includes a memory management unit (MMU) 108, an instruction cache (IC) 112, a data cache 116, and a write buffer (WB) 120. In an embodiment, the MMU 108 manages one or more memory units (e.g., one or more memory units included in the SOC 100 and/or external to the SOC 100, not illustrated in [FIG. 1a] *FIG. 1*) of the SOC 100, the IC 112 caches one or more instructions or codes for the processing core 104, the DC 116 caches data for the processing core 104, and the WB 120 buffers data to be written by the processing core 104 to, for example, a memory and/or a cache included in (or external to) the SOC 100. In an embodiment, the IC 112 and/or the DC 116 acts as a level 1 (L1) cache of the processing core 104.

For the purpose of this disclosure and unless otherwise mentioned, instructions and data refer to different types of information. For example, instructions refer to information that is received, transmitted, cached, accessed, and/or otherwise associated with the instruction cache IC 112, whereas data refers to information that is received, transmitted, cached, accessed, and/or otherwise associated with the data cache DC 116 of the processing core 104. For the purpose of this disclosure and unless otherwise mentioned, information refers to data bits that represent instructions and/or data. Thus, a component of the SOC 100 receiving information implies that the component receives one or more data bits that represent data and/or instructions.

In an embodiment, the MMU 108, IC 112, DC 116 and/or WB 120 interfaces (e.g., transfers information. i.e., transfers data and/or instructions) with one or more other components of the SOC 100 through the BIU 184. That is, the MMU 108, IC 112, DC 116 and/or WB 120 access the BIU 184. Accordingly, the MMU 108, IC 112, DC 116 and/or WB 120 acts as bus agents for the BIU 184. As the MMU 108, IC 112, DC 116 and/or WB 120 are included in a processing core, the MMU 108, IC 112, DC 116 and/or WB 120 are also referred to herein as core bus agents. In an embodiment, one or more of these core bus agents acts as a master to the BIU 184. Although only four core bus agents are illustrated as included in the processing core 104, in an embodiment, the processing core 104 may include any other suitable number of core bus agents as well.

In an embodiment, the SOC 100 also includes a cache 130, which is, for example, a level 2 (L2) cache. In an embodiment, the cache 130 operates on a clock signal that has a different frequency compared to a frequency of a clock signal of the processing core 104 and/or a frequency of a clock signal of the BIU 184.

Referring again to [FIG. 1a] *FIG. 1*, the SOC 100 also includes a bridge module 125 that comprises a first bridge unit 140 and a second bridge unit 142. Thus, the first bridge unit 140 and the second bridge unit 142 collectively form the bridge module 125. The bridge module 125 is operatively coupled to the cache 130, as will be described in more detail herein later.

In an embodiment, a level 2 cache (e.g., the cache 130) is not included in the SOC 100. In another embodiment, a level 2 cache (e.g., the cache 130) is included in the SOC 100, but not coupled to the bridge module 125. For example, [FIG. 1b] *FIG. 2* schematically illustrates an SOC [100a] *101*, in accordance with an embodiment of the present disclosure. The SOC [100a] *101* is, in a manner, similar to the SOC 100 of [FIG. 1a] *FIG. 1*. However, unlike the SOC 100, the SOC [100a] *101* of [FIG. 1b] *FIG. 2* does not illustrate the cache 130 operatively coupled to the bridge module 125. For example, in [FIG. 1b] *FIG. 2*, the cache 130 is not present in the SOC 100, or is present in the SOC 100 but not coupled to the bridge unit 125. In yet another embodiment, the cache 130 is present in the SOC 100, but operates in a disabled mode (e.g., the cache 130 is disabled). In an embodiment, the bridge module 125 detects (or at least is aware of) whether the cache 130 is operatively coupled to the bridge module 125 or not.

The SOC 100 also includes a memory 175 coupled to the BIU 184. The memory 175 may be of any appropriate type, e.g., an appropriate type of random access memory (RAM). Although illustrated to be a part of the SOC 100, in an embodiment, the memory 175 is external to the SOC 100 (although operatively coupled to the SOC 100, for example, via the BIU 184).

In an embodiment, the first bridge unit 140 comprises a first bridge IC module 152 operatively coupled to the IC 112 of the processing core 104. The first bridge IC module 152 is also operatively coupled to an input of a multiplexer (Mux) 172 included in a second bridge IC module 182 of the second bridge unit 142. The first bridge IC module 152 is also operatively coupled to a core instruction port of the cache 130. The cache 130 is operatively coupled to another input of the Mux 172. An output of the Mux 172 is operatively coupled to the BIU 184.

The IC 112 communicates with the BIU 184 and/or the cache 130 through the first bridge IC module 152 and/or the second bridge IC module 182. For example, the first bridge IC module 152 receives information (e.g., one or more instructions or codes) from IC 112. The first bridge IC module 152 selectively transmits the received information to the Mux 172 and/or to the core instruction port of the cache 130 based on various factors, including but not limited to, nature of information (e.g., cacheable or non-cacheable information), status of the cache 130 (e.g., whether the cache 130 is present and/or enabled), and/or the like.

For example, in an embodiment, the first bridge IC module 152 transmits the received information to the cache 130 at least in case the cache 130 is present in the SOC 100, is enabled, and the received information is cacheable (e.g., it is desirable to write the received information in the cache 130, or the received information is configured to be written to the cache 130). In another embodiment, information received by the first bridge IC module 152, from IC 112, is transmitted to the Mux 172 (for transmitting to the BIU 184) at least if the cache 130 is not present in the SOC 100 (e.g., as illustrated in [FIG. 1b] *FIG. 2*) or is not operatively coupled to the bridge module 125, if the cache 130 is disabled, and/or if the received information is non-cacheable (e.g., if it is not desirable to write the received information in the cache 130, or the received information is not configured to be written to the cache 130). Mux 172, upon receiving information from the first bridge IC module 152, transmits the received information to the BIU 184. The Mux 172 also transmits information, received from the cache 130 (e.g., from the cache Instruction port), to the BIU 184. The Mux 172 selectively transmits information from the first bridge IC module 152 and/or the cache 130 to the BIU 184 based on, for example, priority, nature, and/or sequence of information received from the first bridge IC module 152 and/or the cache 130.

Referring again to [FIG. 1a] *FIG. 1*, the first bridge unit 140 also includes a first bridge DC module 156 operatively coupled to the DC 116 of the processing core 104. The first bridge DC module 156 is operatively coupled to an input of a multiplexer (Mux) 176 included in a second bridge DC module 186 in the second bridge unit 142. The first bridge DC module 156 is operatively coupled to the cache 130 (e.g., to a core data port of the cache 130). The cache 130 is operatively coupled to another input of the Mux 176. An output of the Mux 176 is operatively coupled to the BIU 184.

In operation, the DC 116 communicates with the BIU 184 and/or the cache 130 through the first bridge DC module 156 and/or the second bridge DC module 186. For example, the first bridge DC module 156 receives information (e.g., data) from DC 116. The first bridge DC module 156 selectively transmits the received information to the Mux 176 and/or the cache 130, based on various factors, including but not limited to, nature of information (e.g., cacheable or non-cacheable information), status of the cache 130 (e.g., whether the cache 130 is present and/or enabled), and/or the like.

For example, in an embodiment, the first bridge DC module 156 transmits the received information to the cache 130 at least in case the cache 130 is present in the SOC 100, is enabled, and the received information is cacheable. In another embodiment, information received by the first bridge DC module 156 from DC 116, is transmitted to the Mux 176 in case the cache 130 is not present in the SOC 100 (e.g., as illustrated in [FIG. 1b] *FIG. 2*) or is not operatively coupled to the bridge module 125, if the cache 130 is disabled, and/or if the received information is non-cacheable. Mux 176, upon receiving information from the bridge DC module 156, transmits the received information to the BIU 184. The Mux 176 also transmits information, received from the cache 130 (e.g., from the cache data port), to the BIU 184. The Mux 176 selectively transmits information from the first bridge DC module 156 and/or the cache 130 to the BIU 184 based on, for example, priority, nature, and/or sequence of information received from the first bridge DC module 156 and/or the cache 130.

Referring again to [FIG. 1a] *FIG. 1*, the first bridge unit 140 also includes a first bridge WB module 160 operatively coupled to the WB 120 of the processing core 104. The first bridge WB module 160 is also operatively coupled to an input of a multiplexer Mux 180 (included in a second bridge WB module 190 in the second bridge unit 142) and to the cache 130 (e.g., to a core WB port of the cache 130). The cache 130 (e.g., the cache WB port) is also operatively coupled to another input of the Mux 180. An output of the Mux 180 is operatively coupled to the BIU 184.

The first bridge WB module 160 operates at least in part similar to the corresponding first bridge IC module 152 and first bridge DC module 156. For example, the first bridge WB module 160 receives information from WB 120, and transmits the received information to the Mux 180 and/or the cache 130 based on various factors, including but not limited to, nature of information, status of the cache 130, and/or the like.

For example, the first bridge WB module 160 transmits the received information to the cache 130 in case the cache 130 is present in the SOC 100, is enabled, and the received information is cacheable. On the other hand, information received by the first bridge WB module 160 from WB 120 is transmitted to the Mux 190 in case the cache 130 is not present in the SOC 100 (e.g., as illustrated in [FIG. 1b] *FIG. 2*) or is not operatively coupled to the bridge module 125, if the cache 130 is disabled, and/or if the received information is non-cacheable. Mux 180, upon receiving information from the bridge WB module 160, transmits the received information to the BIU 184. The Mux 180 also transmits information, received from the cache 130 (e.g., from the cache WB port), to the BIU 184. The Mux 180 selectively transmits information from the first bridge WB module 160 and/or the cache 130 to the BIU 184 based on, for example, priority, nature, and/or sequence of information received from the first bridge WB module 160 and/or the cache 130.

The bridge module 125, thus, receives information from one or more of the core bus agents, and routes information to appropriate destination (e.g., to the BIU 184 and/or to the cache 130) based on, for example, nature of received information, status of the cache 130, and/or the like. The bridge module 125 also receives information from the BIU 184 (discussed herein later in more detail), and transmits the received information to the one or more of the core bus agents and/or the cache 130 based on, for example, nature of received information, original requester of the received information, status of the cache 130, and/or the like. The bridge module 125 also receives information from the cache 130 (discussed herein later in more detail), and transmits the received information to the one or more of the core bus agents and/or the BIU 184 based on, for example, nature of received information, status of the cache 130, and/or the like.

In an embodiment, information trans-received (e.g., transmitted and/or received) by the MMU 108 is non-cacheable. Accordingly, in [FIG. 1a] *FIG. 1*, the MMU 108 is not operatively coupled to the cache 130 and/or to the bridge module 125. Rather, the MMU 108 directly trans-receives information (e.g., transmits information to and/or receives information from) with the BIU 184, by bypassing the bridge module 125 and the cache 130. However, in another embodiment (not illustrated in [FIG. 1a] *FIG. 1*), the MMU 108 is coupled to the cache 130 and/or to the bridge module 125.

Figure 2:
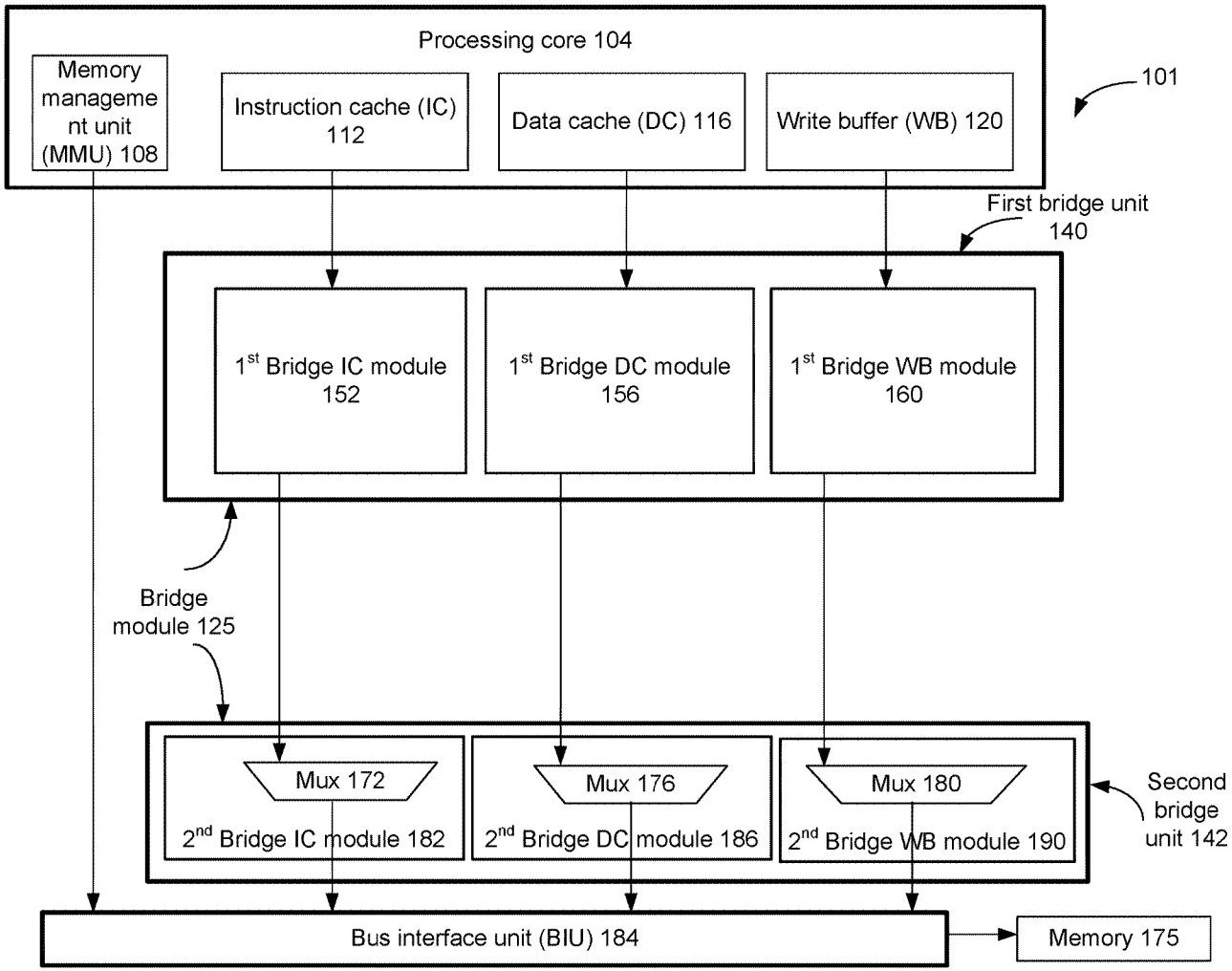
[FIG. 2a] *FIG. 3* schematically illustrates the SOC of [FIG. 1a] *FIG. 1*, with information transmitted from a bus interface unit (BIU) to a processing core and/or to a cache, and/or from the cache to the processing core, in accordance with an embodiment of the present disclosure.
[FIG. 2b] *FIG. 4* schematically illustrates the SOC of [FIG. 1b] *FIG. 2*, with information transmitted from a BIU to a processing core, in accordance with an embodiment of the present disclosure.
Figure 3:
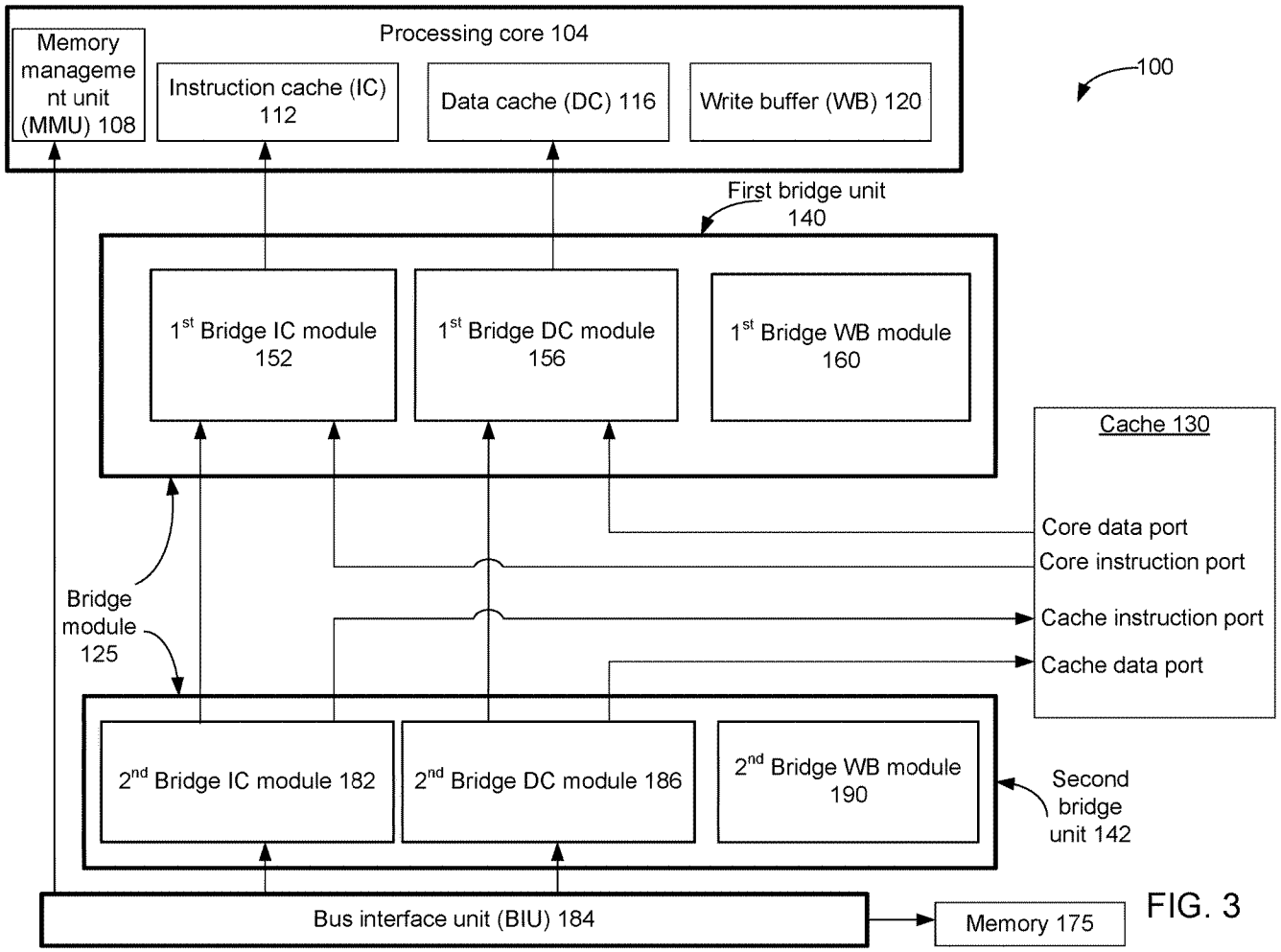
[FIG. 3a-3d]

In [FIG. 1a] *FIG. 1*, information transmission is from the processing core 104 to the cache 130 and/or to the BIU 184, and/or from the cache 130 to the BIU 184. [FIG. 2a] *FIG. 3* schematically illustrates the SOC 100 of [FIG. 1a] *FIG. 1*, with information transmitted from the BIU 184 to the processing core 104 and/or to the cache 130, and/or from the cache 130 to the processing core 104, in accordance with an embodiment of the present disclosure.

Figure 4:
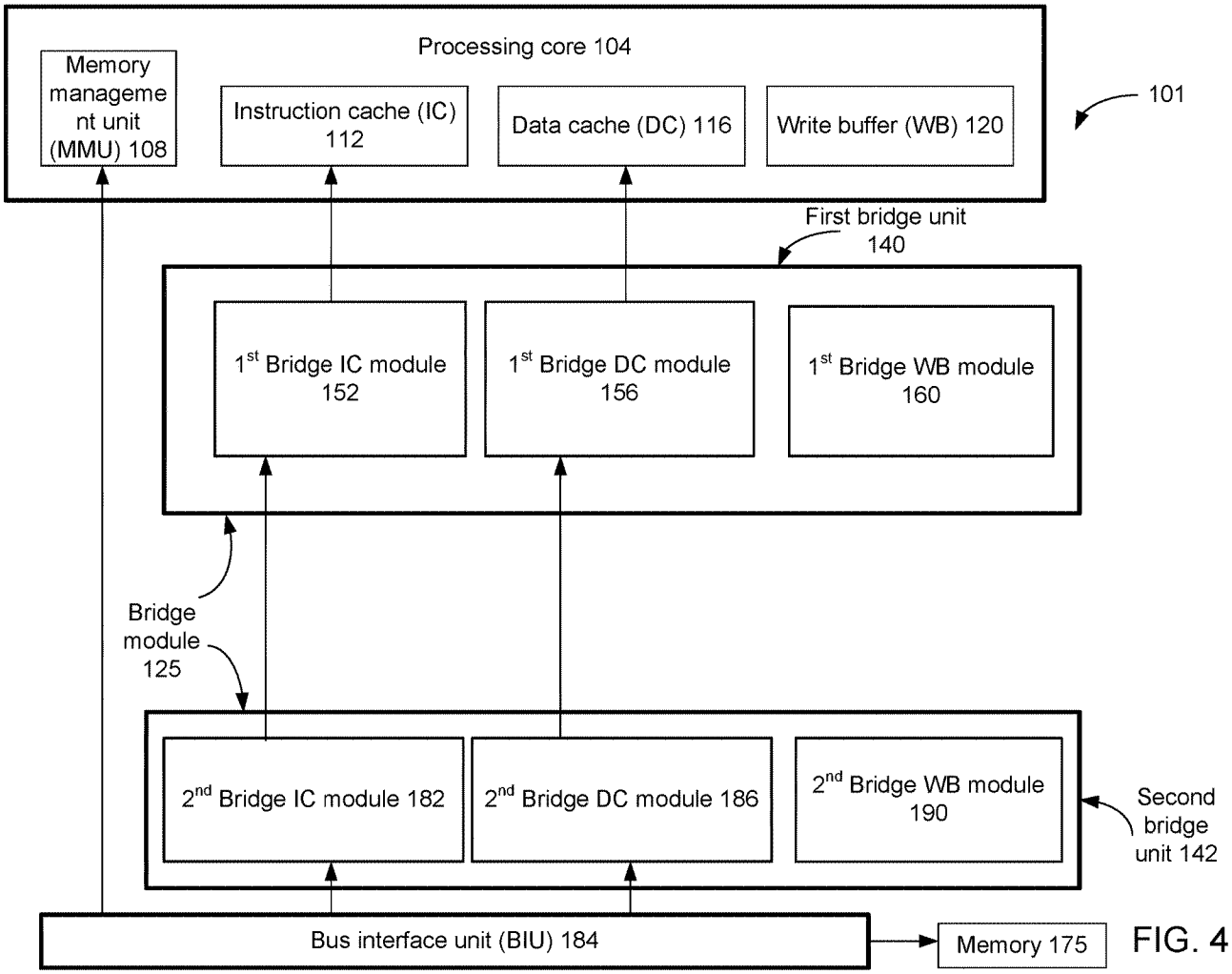
[FIG. 4] *FIG. 9* schematically illustrates a cache suitable for use with the SOCs of [FIGS. 1a and 2a] *FIGS. 1 and 3*, in accordance with an embodiment of the present disclosure.

As previously discussed, in an embodiment, a level 2 cache (e.g., the cache 130) may not *be* included in the SOC 100 (or may be included in the SOC 100, but not coupled to the bridge module 125), as illustrated in [FIG. 1b] *FIG. 2*. [FIG. 2b] *FIG. 4* schematically illustrates the SOC [100a] *101* of [FIG. 1b] *FIG. 2*, with information transmitted from the BIU 184 to the processing core 104, in accordance with an embodiment of the present disclosure.

[FIG. 2a] *FIG. 3* illustrates the SOC 100, however some of the components of the SOC 100 are not illustrated in [FIG. 2a] *FIG. 3* for the purpose of clarity and to avoid obfuscating teaching principles of the embodiment. For example, Mux 172, Mux 176, and Mux 180 of [FIG. 1a] *FIG. 1* are not illustrated in the SOC 100 of [FIG. 2a] *FIG. 3*, although these components are present in the SOC of [FIG. 2a] *FIG. 3*. Similarly, [FIG. 2b] *FIG. 4* illustrates the SOC [100a] *101*, however some of the components of the SOC [100a] *101* are not illustrated in [FIG. 2b] *FIG. 4* for the purpose of clarity and to avoid obfuscating teaching principles of the embodiment.

Referring to [FIG. 2a] *FIG. 3*, the second bridge IC module 182 receives information from the BIU 184. Information received by the second bridge IC module 182 may be intended for, or at least associated with, the IC 112 of the processing core 104. The second bridge IC module 182 selectively transmits the received information directly to the first bridge IC module 152 (e.g., by bypassing the cache 130) and/or to the cache 130, based on various factors, including but not limited to, nature of information (e.g., cacheable or non-cacheable information), status of the cache 130 (e.g., whether the cache 130 is present and/or enabled), the original request for the information (e.g., whether the information is received in response to a pre-fetch command of the cache 130, wherein the information is received in response to a cache miss command), and/or the like.

For example, information received by the second bridge IC module 182 is transmitted directly to the first bridge IC module 152 (e.g., by bypassing the cache 130) if the information is non-cacheable, if the cache 130 is not present in the SOC (e.g., as illustrated in [FIG. 2b] *FIG. 4*) or is disabled, and/or the like. In case cache 130 is present in the SOC 100 and the received information is cacheable, the received information is transmitted to the cache 130 (e.g., to the cache Instruction port in the cache 130) by the second bridge IC module 182. In an embodiment, cacheable information received by the second bridge IC module 182 is transmitted directly to the first bridge IC module 152 (for transmission to the IC 112) and to the cache 130 as well. For example, in case the information is received by the second bridge IC module 182 in response to an earlier cache miss command, the received information is transmitted directly to the IC 112 through the first bridge IC module 152 (e.g., by bypassing the cache 130) and also to the cache 130 (for caching the received information). In an embodiment, the cache 130 may pre-fetch information from a memory (e.g., memory 175), anticipating, for example, that the processing core 104 may request the pre-fetched information in future. In case the information is received by the second bridge IC module 182 in response to a pre-fetch command of the cache 130, the received information is transmitted to the cache 130 (and not directly to the IC 112 through the first bridge IC module 182, as the IC 112 may not have requested the pre-fetched information yet).

Also, the cache 130 (e.g., using the core Instruction port) transmits information to the IC 112 through the first bridge IC module 152. Thus, the first bridge IC module 152 receives information from the second bridge IC module 182 and/or from the cache 130, and selectively transmits the received information to the IC 112.

Referring again to [FIG. 2a] *FIG. 3*, the second bridge DC module 186 receives information from the BIU 184. The second bridge DC module 186 selectively transmits the received information directly to the first bridge DC module 156 (e.g., for transmission to DC 116, by bypassing the cache 130) and/or to the cache 130, based on various factors, including but not limited to, nature of information, status of the cache 130, the original request for the information, and/or the like.

For example, in an embodiment, information received by the second bridge DC module 186 is transmitted directly to the first bridge DC module 156 (e.g., by bypassing the cache 130) if the information is non-cacheable, if the cache 130 is not present in the SOC (e.g., as illustrated in [FIG. 2b] *FIG. 4*) or is disabled, and/or the like. In case cache 130 is present in the SOC 100 and the received information is cacheable, the received information is transmitted to the cache 130 (e.g., to the cache data port in the cache 130) by the second bridge DC module 186. In an embodiment, cacheable information received by the second bridge DC module 186 is transmitted directly to the first bridge DC module 156 (e.g., for transmitting to the DC 116) and to the cache 130 as well. For example, in case the information is received by the second bridge DC module 186 in response to an earlier cache miss command, the received information is transmitted directly to the DC 116 through the first bridge DC module 156 and also to the cache 130 (for caching the received information). In case the information is received by the second bridge DC module 186 in response to a pre-fetch command of the cache 130, the received information is transmitted to the cache 130 (and not directly to the DC 116 through the first bridge DC module 186, as the DC 116 may not have requested the pre-fetched information yet).

Also, the cache 130 (e.g., using the core data port) transmits information to the DC 116 through the first bridge DC module 156. Thus, the first bridge DC module 156 receives information from the second bridge DC module 186 and/or from the cache 130, and selectively transmits the received information to the DC 116.

As previously discussed, the WB 120 buffers information to be written by the processing core 104 to, for example, a memory (e.g., memory 175), a cache (e.g., cache 130), and/or any other component included in (or external to) the SOC 100. Accordingly, the WB 120 receives information from one or more components of the processing core 104, and transmits the received information to one or more other components of the SOC 100. However, in an embodiment, the WB 120 does not receive information directly from, for example, the BIU 184 and/or the cache 130. Accordingly, [FIG. 2a] *FIG. 3* illustrates the WB 120, the first bridge WB module 160 and/or the second bridge WN module 190 as not receiving information from the BIU 184 and/or the cache 130.

Also, as previously discussed, information transmitted and/or received by the MMU 108 may not be cacheable. Accordingly, [FIG. 2a] *FIG. 3* illustrates the MMU 108 receiving information directly from the BIU 184 (e.g., by bypassing the bridge module 125 and the cache 130).

As previously discussed, in an embodiment, the respective frequencies of clock signals associated with the processing core 104, cache 130 and/or the BIU 184 are different. Also, in an embodiment, the operating bandwidths of the processing core 104, cache 130 and/or the BIU 184 are also different. The bridge module 125 acts as a bridge between these components, thereby allowing seamless information transfer between processing core 104, cache 130 and/or the BIU 184, notwithstanding that each possibly has a different operating frequency and/or bandwidth requirement.

Also, the bridge module 125 allows the processing core 104 and the BIU 184 to operate irrespective of whether the cache 130 is present or absent in the SOC, irrespective of whether the cache 130 is operatively coupled to the bridge module 125, and irrespective of whether the cache 130 is on or off the same die as the SOC. In an embodiment, the bridge module 125 ensures that the design and operation of the processing core 104 and/or the BIU 184 remains, at least in part, unchanged irrespective of whether the cache 130 is present or absent in the SOC. The bridge module 125 essentially makes the cache 130 transparent to the processing core 104 and/or the BIU 184. For example, a core bus agent (e.g., the IC 112) may want to transmit information to the BIU 184. However, instead of the BIU 184, the information from IC 112 is received by the bridge module 125 (e.g., by the first bridge IC module 152). Based on one or more previously discussed criteria, the bridge module 125 selectively transmits information received from the processing core 104 to the BIU and/or the cache. However, the processing core 104 may not be aware of a presence or absence of the cache 130. Rather, the processing core 104 transmits information to the bridge module 125, assuming, for example, that it is transmitting information to the BIU 184. The bridge module 125 makes the cache 130 transparent to the processing core 104. The bridge module 125 also imitates the role of the BIU 184 to the processing core 104. In a similar manner, the bridge module 125 makes the cache 130 transparent to the BIU 184. Also, the bridge module 125 imitates the role of the processing core 104 to the BIU 184.

The bridge module 125 also makes itself transparent to the processing core 104 and the BIU 184. For example, if the bridge module 125 and the cache 130 is absent in the SOC 100, the processing core 104 connects directly to the BIU 184, and the operations (and configurations) of the processing core 104 and/or the BIU 184 remains unchanged. Both the cache 130 and the bridge module 125 are transparent to the processing core 104 and the BIU 184.

Figure 5:
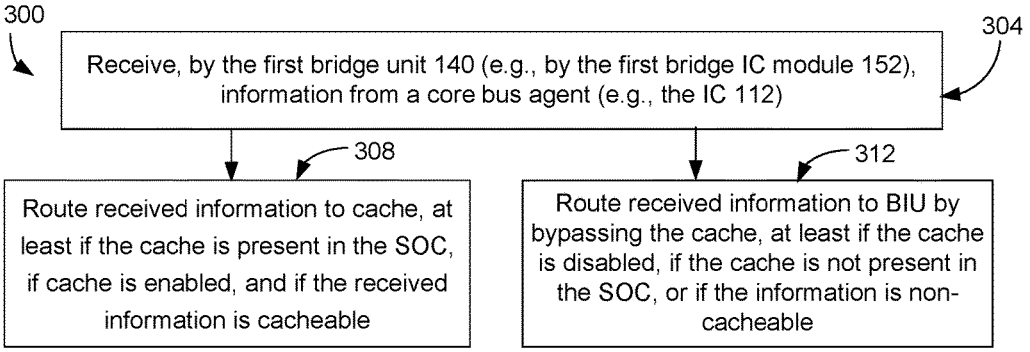
*FIGS. 5-8* illustrate methods for operating the SOCs of [FIGS. 1a, 1b, 2a and/or 2b] *FIGS. 1, 2, 3 and/or 4*, in accordance with an embodiment of the present disclosure.

[FIG. 3a] *FIG. 5* illustrates a method [300a] *300* for operating the SOCs of [FIGS. 1a and/or 1b] *FIGS. 1 and/or 2*, in accordance with an embodiment of the present disclosure. The method [300a] *300* includes, at 304, receiving, by one of the modules (e.g., the first bridge IC module 152) of the first bridge unit 140, information from a corresponding core bus agent (e.g., the IC 112). At 308, in accordance with an embodiment, the first bridge IC module 152 routes received information to a cache (e.g., the L2 cache 130), at least if, for example, the cache is present in the SOC 100 and is operatively coupled to the bridge module 125, if the cache 130 is enabled, and if the received information is cacheable. Alternatively (or additionally), at 312, the first bridge IC module 152 routes received information to the BIU 184 (e.g., through the second bridge IC module 182 of the second bridge unit 142) by bypassing the cache, at least if, for example, the cache is disabled, if the cache is not present in the SOC (e.g., SOC [100a] *101* in [FIG. 1a] *FIG. 1*) or is not operatively coupled to the bridge module 125, or if the information is non-cacheable.

Figure 6:
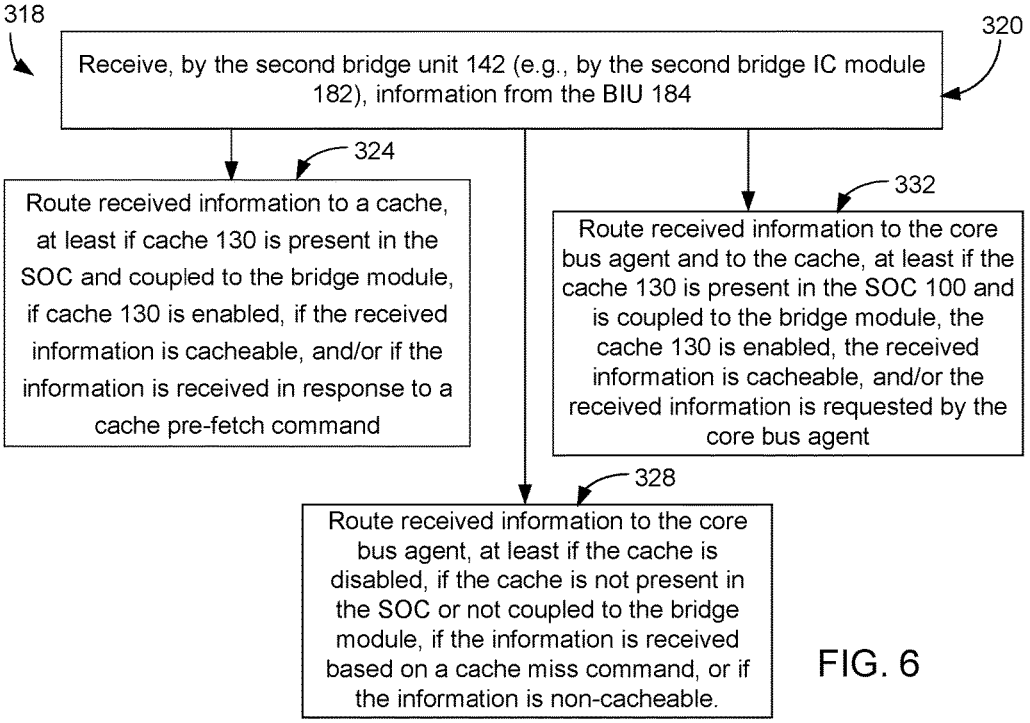

[FIG. 3b] *FIG. 6* illustrates another method [300b] *318* for operating the SOCs of [FIGS. 2a and/or 2b] *FIGS. 3 and/or 4*, in accordance with an embodiment of the present disclosure. The method [300b] *318* includes, at 320, receiving, by one of the modules (e.g., by the second bridge IC module 182) of the second bridge unit 142, information from the BIU 184. At 324, the second bridge IC module 182 routes received information to the cache 130, at least if, for example, cache 130 is present in the SOC 100 and is operatively coupled to the bridge module 125, if cache 130 is enabled, if the received information is cacheable and/or if the information is received in response to a cache pre-fetch command. Alternatively, at 328, second bridge IC module 182 routes received information to the associated core bus agent (e.g., IC 112) through the first IC bridge unit 152, at least, for example, if the cache 130 is disabled, if the cache 130 is not operatively coupled to the bridge module 125, if cache 130 is not present in the SOC 100, if the information is received based on a cache miss command, and/or if the information is non-cacheable. Alternatively, at 332, information received by the second bridge unit 142 is routed to the cache 130 and also to the core bus agent in case, for example, the cache 130 is present in the SOC 100 and is operatively coupled to the bridge module 125, the cache 130 is enabled, the received information is cacheable, and the received information is requested by the core bus agent. Routing the information to the core bus agent along with routing the information to the cache (e.g., instead of routing the information to the core bus agent through the cache) decreases the latency of passing data from the BIU 184 to the core bus agent.

Figure 7:
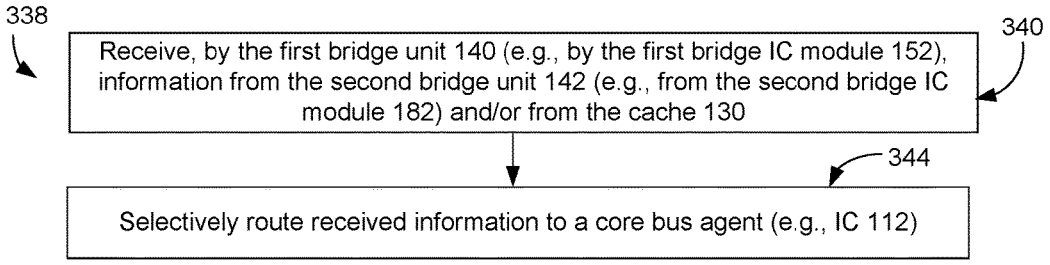

[FIG. 3c] *FIG. 7* illustrates another method [300c] *338* for operating the SOCs of [FIGS. 1a and/or 1b] *FIGS. 1 and/or 2*, in accordance with an embodiment of the present disclosure. The method [300c] *338* includes, at 340, receiving, by one of the modules (e.g., by the first bridge IC module 152) of the first bridge unit 140, information from the second bridge unit 142 (e.g., from the second bridge IC module 182) and/or from the cache 130. At 344, the first bridge IC module 152 selectively routes the received information to a corresponding core bus agent (e.g., IC 112). For example, the first bridge IC module 152 may include a multiplexer (not illustrated in [FIGS. 1a and 1b] *FIGS. 1 and 2*) to multiplex information received from the second bridge IC module 182 and/or from the cache 130, and output the multiplexed information to the IC 112.

Figure 8:
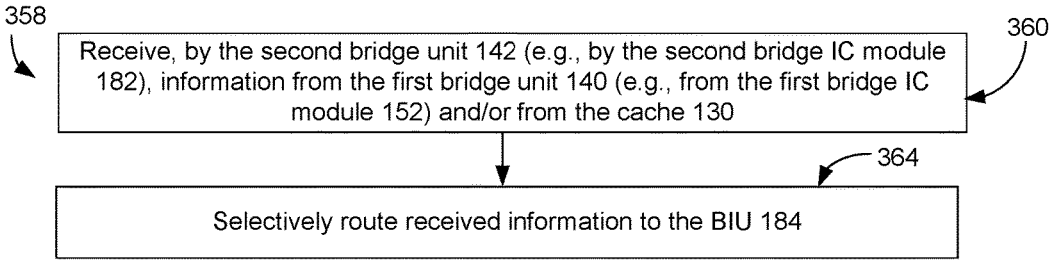

[FIG. 3d] *FIG. 8* illustrates another method [300d] *358* for operating the SOCs of [FIGS. 2a and/or 2b] *FIGS. 3 and/or 4*, in accordance with an embodiment of the present disclosure. The method [300d] *358* includes, at 360, receiving, by one of the modules (e.g., by the second bridge IC module 182) of the second bridge unit 142, information from the first bridge unit 140 (e.g., from the first bridge IC module 152) and/or from the cache 130. At 364, the second bridge IC module 182 selectively routes received information to the BIU 184.

Figure 9:
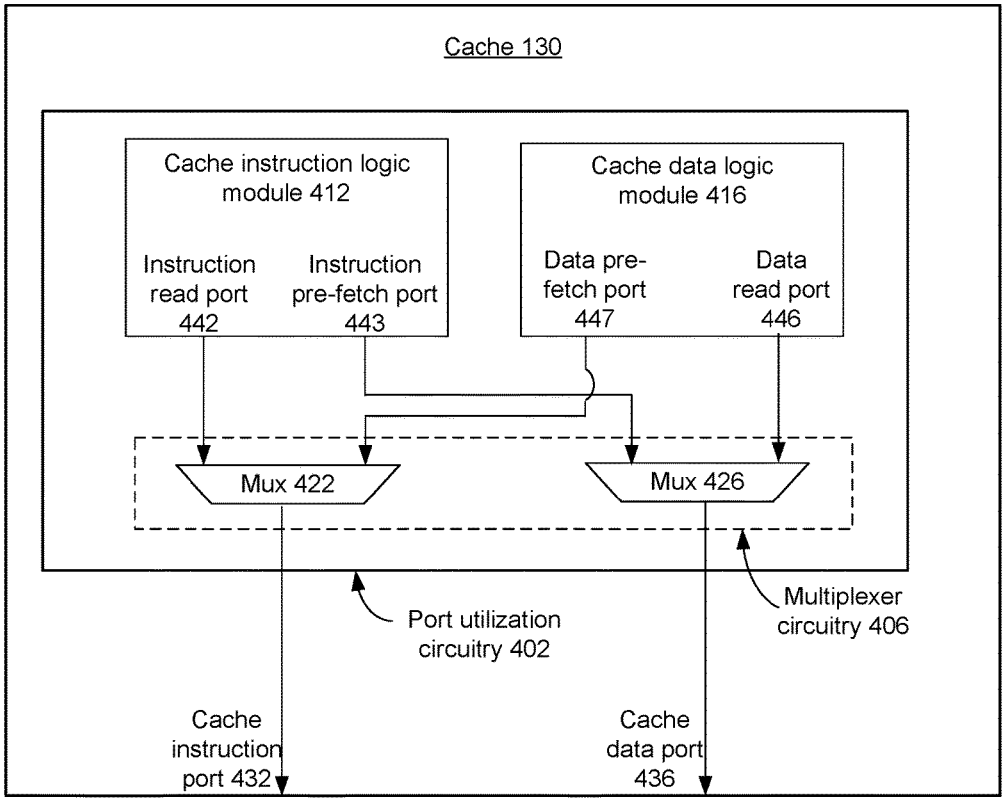

[FIG. 4] *FIG. 9* schematically illustrates the cache 130 of SOC 100 of [FIGS. 1a and 2a] *FIGS. 1 and 3* in more detail, in accordance with an embodiment of the present disclosure. Cache 130 includes a port utilization circuitry 402. In accordance with the implementation illustrated in [FIG. 4] *FIG. 9*, the port utilization circuitry 402 includes a cache instruction logic module 412, a cache data logic module 416, and a multiplexer circuitry 406 (illustrated in dotted lines). It is noted that other suitable architectures may be implemented. The cache instruction logic module 412 is associated with caching instructions in the cache 130. The cached instructions may be accessed or used by, for example, the IC 112 of the processing core 104 of SOC 100 (see [FIGS. 1a and 2a] *FIGS. 1 and 3*). The cache data logic module 416 is associated with caching data in the cache 130. The cached data may be accessed or used by, for example, the DC 116 of the processing core 104 of SOC 100 (see [FIGS. 1a and 2a] *FIGS. 1 and 3*).

The cache instruction logic module 412 includes an instruction read port [442a] *442* and an instruction pre-fetch port [442b] *443*. The cache data logic module 416 includes a data read port [446a] *446* and a data pre-fetch port [446b] *447*. The cache 130 also includes a cache instruction port 432 and a cache data port 436. In accordance with an embodiment, the multiplexer circuitry 406 includes a multiplexer (Mux) 422 and a multiplexer (Mux) 426. The Mux 422 selectively connects the instruction read port [442a] *442* and the data pre-fetch port [446b] *447* to the cache instruction port 432. Multiplexer (Mux) 426 selectively connects the data read port [446a] *446* and the instruction pre-fetch port [442b] *443* to the cache data port 436, as illustrated in [FIG. 4] *FIG. 9*.

Although not illustrated in [FIG. 4] *FIG. 9* for the purpose of clarity, in an embodiment, the cache instruction port 432 and the cache data port 436 are operatively coupled to the second bridge IC module 182 and the second bridge DC module 186, respectively, as illustrated in [FIGS. 1a and 2a] *FIGS. 1 and 3*. Referring to [FIGS. 1a, 2a, and 4] *FIGS. 1, 3, and 9*, the cache instruction port 432 and the cache data port 436 trans-receives (e.g., transmits and/or receives) information (e.g., instructions and/or data) from one or more components of the SOC 100 (e.g., memory 175) through the bridge module 125 (e.g., through the second bridge IC module 182 and the second bridge DC module 186, respectively) and through the BIU 184.

A cache command may either be a hit or a miss. For example, the processing core 104 may request information (e.g., instruction and/or data). The cache 130 transmits the requested information to the processing core 104, in case the information is cached in the cache 130 and is valid (i.e., the cached information is in synchronization with a memory, e.g., memory 175). However, in case the requested information is not already cached in the cache 130 and/or is dirty (e.g., the cached information is not in synchronization with memory 175), this results in a cache read miss. If a cache command is a miss, new information is fetched by the cache 130 from the memory 175, and cached in the cache 130.

Thus, the cache 130 periodically fetches information (e.g., data and/or instructions) from memory 175 based on, for example, information required by the processing core. For example, in the event that the processing core 104 requests instructions that are not available in the cache 130 and/or are dirty, the cache instruction logic module 412 requests (e.g. by issuing suitable commands to the memory) the instructions from the memory 175. Similarly, in case the processing core 104 requests data that are not available in the cache 130 and/or are dirty, the cache data logic module 416 requests the data from the memory 175. Such requests for information (data and/or instructions) are transmitted by the cache instruction logic module 412 and/or the cache data logic module 416 to the memory 175 through the cache instruction port 432 and/or the cache data port 436, and also through the second bridge unit 142 and the BIU 184. Similarly, the requested information is received by the cache 130 from the memory 175 through the BIU 184 and the second bridge unit 142.

In an embodiment, information (data and/or instructions) in the cache may be stored in the form of a plurality of cache lines, and each cache line may store multiple data bytes (e.g., 32 bytes). In an embodiment, fetching new information from the memory 175 is done in a resolution of a half cache line, a full cache line, or the like. For the sake of simplicity and without loss of generality, it is herein assumed that information from the memory 175 is fetched in the resolution of a full cache line. However, in other embodiments, information from the memory 175 may be fetched in the resolution of a half cache line (or any other multiple or fraction of a full cache line), and the teachings of the present disclosure apply to these embodiments as well.

Thus, based on the requirement of the processing core 104, the cache 130 fetches a cache line of information from the memory 175, in case, for example, the information is not cached in the cache 130 and/or is dirty.

The cache 130 may also pre-fetch information from the memory 175 based on, for example, anticipating future requirement of the pre-fetched information by the processing core 104. For example, in an embodiment, the processing core 104 requests certain information, which the cache 130 determines is not cached in the cache 130 (or is cached in the cache 130, but is dirty). Accordingly, the cache 130 performs a line fill update command, wherein the cache 130 requests a first information line (that includes information requested by the processing core 104) from the memory 175. The cache 130 may also anticipate that the processing core 104 may also request further information in a short while. For example, the cache 130 may anticipate that the processing core 104 may also request further information that is included in a second information line. For example, the first and second line of information may include two consecutive lines of codes or instructions, based on which the cache may anticipate the future requirement of the second line of information by the processing core 104. Accordingly, in an embodiment, the cache 130 may pre-fetch the second line of information (e.g., before the information included in the second line of information is actually requested by the processing core 104) along with, or subsequent to, fetching the first line of information.

As previously discussed, the cache instruction logic module 412 initiates a request for fetching a line of instruction from the memory 175. In an embodiment, the cache instruction logic module 412 issues a first request for fetching a first line of instruction through the instruction read port [442a] *442*, the first multiplexer 422, the cache instruction port 432, the second bridge IC module 182, and the BIU 184 (see [FIGS. 1a and 4] *FIGS. 1 and 9*). Concurrently with or subsequent to issuing the first request for fetching the first line of instruction, the cache instruction logic module 412 also determines whether the cache data port 436 is currently being used by the cache data logic module 416. In case the cache data port 436 is currently available (i.e., in case the cache data logic module 416 is not currently using the cache data port 436 for fetching one line or more lines of data), the cache instruction logic module 412 uses the cache data port 436 for pre-fetching instructions from the memory 175. For example, the cache instruction logic module 412 issues a pre-fetch request for a second line of instruction to memory 175 through the instruction pre-fetch port [442b] *443*, the second multiplexer 426, the cache data port 436, the second bridge DC module 186, and the BIU 184 (see [FIGS. 1a and 4] *FIGS. 1 and 9*). The fetch request for the first line of instruction through the instruction read port [442a] *442* and the pre-fetch request for the second line of instruction through the instruction pre-fetch port [442b] *443* may be carried out substantially simultaneously (e.g., in parallel), sequentially, or at least in an overlapping manner (e.g., at least a part of the fetch request and the pre-fetch request is simultaneous). The memory 175, upon receiving, from the cache 130, the fetch and pre-fetch requests for the first and second lines of instructions sent via cache instruction port 432 and cache data port 436 respectively, processes the two requests substantially simultaneously, (e.g., in parallel), sequentially, or at least in an overlapping manner, based on the operation of the memory 175.

In an embodiment, the requested first and second lines of instructions arrive from the memory 175 to the cache 130 simultaneously (e.g., in parallel), sequentially, or at least in an overlapping manner over the cache instruction port 432 and the cache data port 436, respectively, through the BIU 184 and through the second bridge IC module 182 and the second bridge DC module 186, respectively.

As previously discussed, the first line of instruction is fetched by the cache 104 based on a requirement of the processing core 104, while the second line of instruction is pre-fetched by the cache 104 based on anticipating a future requirement of the processing core 104. That is, during the fetching and the pre-fetching process, processing core 104 has requested and requires only the first line of instruction. Accordingly, when the second bridge unit 142 receives the requested first line of instruction from the memory 175 through the BIU 184, the second bridge unit 142 transmits the requested first line of instruction to the processing core 104 (as the processing core 104 actually requested information included in the first line of instruction) and also to the cache 130 (so that the cache 130 caches the first line of instruction). However, when the second bridge unit 142 receives the requested (i.e., pre-fetched) second line of instruction from the memory 175 through the BIU 184, the second bridge unit 142 does not transmit the requested second line of instruction to the processing core 104 (as the processing core 104 did not yet request instructions included in the second line of instruction). Rather, the second bridge unit 142 transmits the requested second line of instruction only to the cache 130 (so that the cache 130 caches the second line of instruction).

Once the cache 130 receives the first and second lines of instructions, the cache instruction logic module 412 relinquishes the control of the cache data port 436, so that the cache data logic module 416 may gain back control of the cache data port 436.

In a similar manner, the cache data logic module 416 issues a data fetch request to the memory 175 for a first line of data through the data read port [446a] *446*, multiplexer 426, cache data port 436, the second bridge DC module 186, and the BIU 184. The cache data logic module 416 also determines whether the cache instruction port 432 is being used by the cache instruction logic module 412. In case the cache instruction port 432 is currently available (i.e., the cache instruction logic module 412 is not currently using the cache instruction port 432 to request one or more lines of instructions), the cache data logic module 416 uses the cache instruction port 432 for pre-fetching data from the memory 175. For example, the cache data logic module 416 issues a pre-fetch request for a second line of data through the data pre-fetch port [446b] *447*, the first multiplexer 422, the cache instruction port 432, the second bridge IC module 182, and the BIU 184. The fetch request for the first line of data through the data read port [446a] *446* and the pre-fetch request for the second line of data through the data pre-fetch port [446b] *447* may be carried out substantially simultaneously (e.g., in parallel), sequentially, or at least in an overlapping manner. The memory 175, upon receiving, from the cache 130, the fetch and pre-fetch requests for the first and second lines of data sent via cache data port 436 and cache instruction port 432 respectively, process the two requests substantially simultaneously (e.g., in parallel), sequentially, or in at least an overlapping manner, based on the operation of the memory 175.

In an embodiment, the requested first and second lines of data arrive from the memory 175 to the cache 130 simultaneously (e.g., in parallel), sequentially, or at least in an overlapping manner over the cache data port 436 and the cache instruction port 432, respectively, through the second bridge DC module 186 and the second bridge IC module 182, respectively.

Also, the first line of data is fetched by the cache 130 based on a requirement of the processing core 104, while the second line of data is fetched by the cache 130 based on anticipating a future requirement of the processing core 104. Accordingly, when the second bridge unit 142 receives the requested first line of data from the memory 175 through the BIU 184, the second bridge unit 142 transmits the requested first line of data to the processing core 104 (as the processing core 104 actually requested information included in the first line of data) and also to the cache 130 (so that the cache 130 caches the first line of data). However, when the second bridge unit 142 receives the requested (i.e., pre-fetched) second line of data from the memory 175 through the BIU 184, the second bridge unit 142 does not transmit the requested second line of data to the processing core 104 (as the processing core 104 did not yet request data included in the first line of data). Rather, the second bridge unit 142 transmits the requested second line of data only to the cache 130 (so that the cache 130 caches the second line of data).

Once the cache 130 receives the first and second lines of data, the cache data logic module 416 relinquishes control of the cache instruction port 436, so that the cache instruction logic module 416 may gain back control of the cache instruction port 432.

Figure 10:
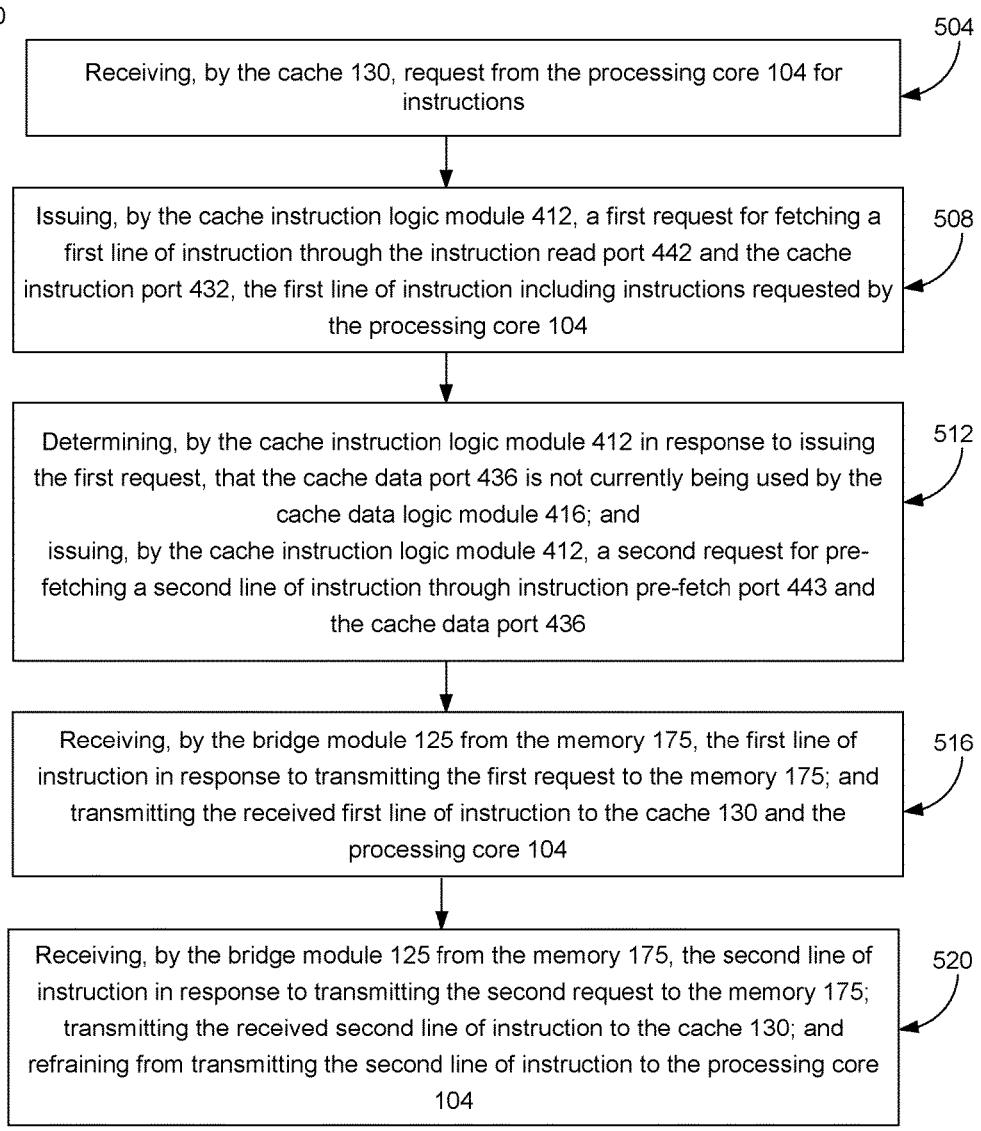
*FIGS. 10 and 11* illustrate methods for operating the SOCs of [FIGS. 1a and/or 2a] *FIGS. 1 and/or 3*, in accordance with an embodiment of the present disclosure.

[FIG. 5] *FIG. 10* illustrates a method 500 for operating SOC 100 of [FIGS. 1a and/or 2a] *FIGS. 1 and/or 3*, in accordance with an embodiment of the present disclosure. Referring to [FIGS. 1a, 2a and 5] *FIGS. 1, 3 and 10*, method 500 includes, at 504, receiving, by the cache 130, request from the processing core 104 for one or more instructions. The requested instructions may not be cached in the cache 130 or may be dirty. Accordingly, in accordance with the embodiment seen, at 508, the cache instruction logic module 412 issues, to the memory 175, a first request for fetching a first line of instruction, the first request transmitted to the memory 175 through the instruction read port [442a] *442*, multiplexer 422, the cache instruction port 432, the second bridge IC module 182 and the BIU 184. The first line of instruction includes instructions requested by the processing core 104. At 512, the cache instruction logic module 412 determines, in response to issuing the first request, that the cache data port 436 is not currently being used by the cache data logic module 416. At 512, the cache instruction logic module 412 also issues a second request to the memory 175 for pre-fetching a second line of instruction through instruction pre-fetch port [442b] *443*, the multiplexer 426, the cache data port 436, the second DC bridge module 186 and the BIU 184. Thus, the multiplexer 426 selectively transmits the pre-fetch request from the instruction pre-fetch port [442b] *443* to the cache data port 436. At 516, the bridge module 125 (e.g., the second bridge IC module 182) receives, from memory 175, the first line of instruction in response to transmitting the first request to the memory 175. The bridge module 125 transmits the received first line of instruction to the cache 130 and the processing core 104. At 520, the bridge module 125 also receives, from the memory 175, the second line of instruction in response to transmitting the second request to the memory 175. The bridge module 125 transmits the received second line of instruction to the cache 130, and refrains from transmitting the second line of instruction to the processing core 104. In an embodiment, the operations at 508 and 512 may be performed substantially simultaneously (e.g., in parallel), sequentially, or at least in an overlapping manner. In an embodiment, the operations at 516 and 520 may be performed substantially simultaneously (e.g., in parallel), sequentially, or at least in an overlapping manner.

Figure 11:
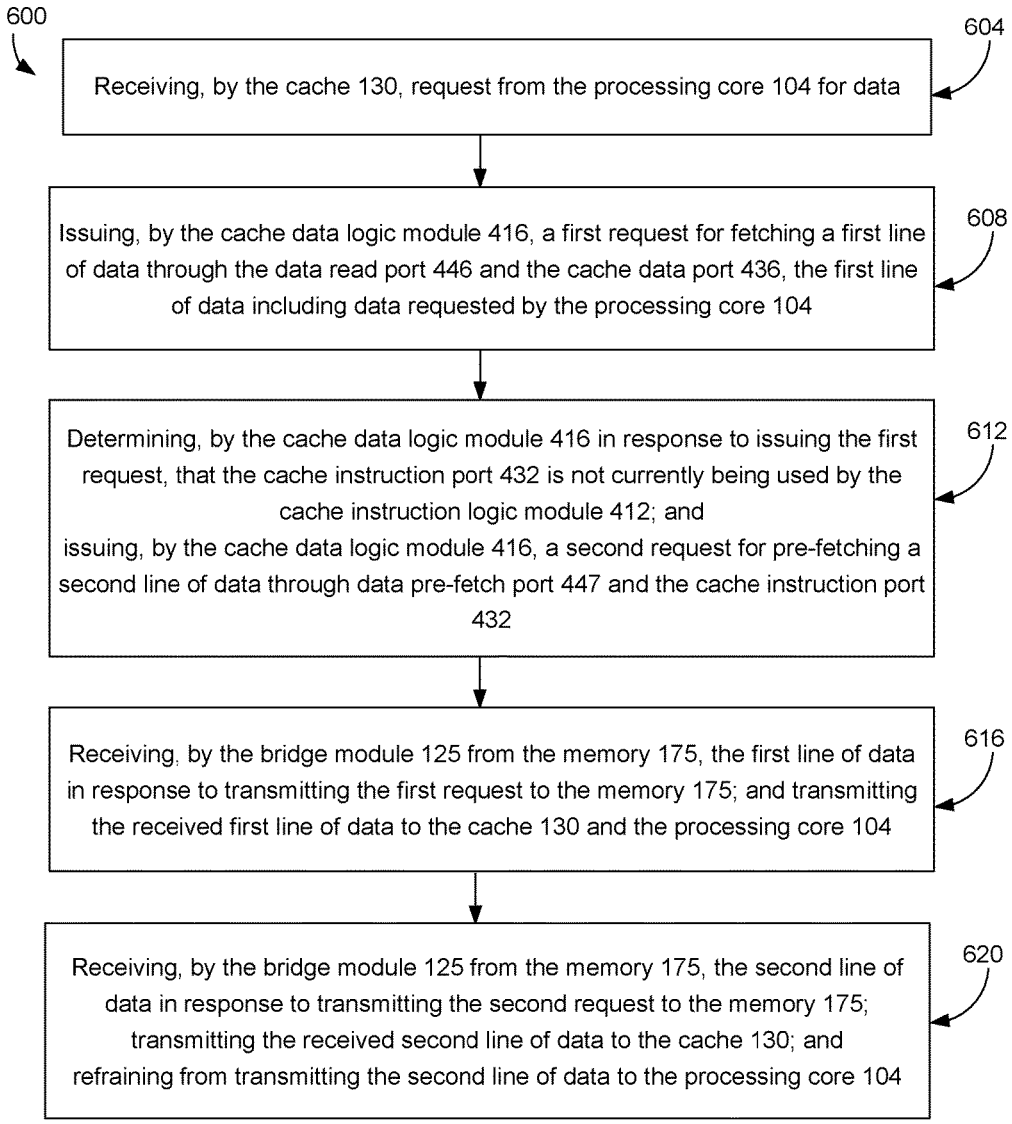

[FIG. 6] *FIG. 11* illustrates a method 600 for operating SOC 100 of [FIGS. 1a and/or 2a] *FIGS. 1 and/or 3*, in accordance with an embodiment of the present disclosure. Referring to [FIGS. 1a, 2a and 6] *FIGS. 1, 3 and 11*, method 600 includes, at 604, receiving, by the cache 130, request from the processing core 104 for data. The requested data may not be cached in the cache 130 or may be dirty. Accordingly, in accordance with the embodiment seen, at 608, the cache data logic module 416 issues, to the memory 175, a first request for fetching a first line of data, the first request transmitted to the memory 175 through the data read port [446a] *446*, multiplexer 426, the cache data port 436, the second bridge DC module 186 and the BIU 184. The first line of data includes data requested by the processing core 104. At 612, the cache data logic module 416 determines, in response to issuing the first request, that the cache instruction port 432 is not currently being used by the cache instruction logic module 412. At 612, the cache data logic module 416 also issues a second request to the memory 175 for pre-fetching a second line of data through data pre-fetch port [446b] *447*, the multiplexer 422, the cache instruction port 432, the second IC bridge module 182 and the BIU 184. Thus, the multiplexer 422 selectively transmits the pre-fetch request from the data pre-fetch port [446b] *447* to the cache instruction port 432. At 616, the bridge module 125 (e.g., the second bridge DC module 186) receives, from memory 175, the first line of data in response to transmitting the first request to the memory 175. The bridge module 125 transmits the received first line of data to the cache 130 and the processing core 104. At 620, the bridge module 125 also receives, from the memory 175, the second line of data in response to transmitting the second request to the memory 175. The bridge module 125 transmits the received second line of data to the cache 130, and refrains from transmitting the second line of data to the processing core 104. In an embodiment, the operations at 608 and 612 may be performed substantially simultaneously (e.g., in parallel), sequentially, or at least in an overlapping manner. In an embodiment, the operations at 616 and 620 may be performed substantially simultaneously (e.g., in parallel), sequentially, or at least in an overlapping manner.

Thus, the cache 130 uses only two ports (e.g., the cache instruction port 432 and cache data port 436) to fetch and pre-fetch both instructions and data. Unlike some conventional system, the cache 130 does not need dedicated ports for pre-fetching instructions and/or data. Also, pre-fetching instructions concurrently with fetching instructions reduce the latency in receiving instructions from the memory 175. Similarly, pre-fetching data concurrently with fetching data reduce the latency in receiving data from the memory 175.

Also, introducing the pre-fetching operations of instructions and data, using the data port 436 and instruction port 432, do not necessitate any change in configuration or operation of the processing core 104 and BIU 184 (e.g., no additional port is necessary in the processing core 104 and/or BIU 184 to accommodate the pre-fetch operation of the cache 130). Thus, the pre-fetching operation is transparent to the processing core 104 and BIU 184.

Pre-fetch requests may change the operation of the bridge module 125. For example, as previously discussed, if the requested information is associated with a fetch request, the bridge module 125 transmits the information received from the memory 175 to the processing core 104 and to the cache 130. On the other hand, if the requested information is associated with a pre-fetch request, the bridge module 125 transmits the information received from the memory 175 to the cache 130, but not to the processing core 104. However, the pre-fetching operations do not necessitate any change in the configuration of the bridge module 125 (e.g., no additional port is necessary in the bridge module 125 to accommodate the pre-fetch operation of the cache 130).

Although specific embodiments have been illustrated and described herein, based on the foregoing discussion it is appreciated by those of ordinary skill in the art and others, that a wide variety of alternate and/or equivalent implementations may be substituted for the specific embodiment illustrated and described without departing from the scope of the present disclosure. This present disclosure covers all methods, apparatus, and articles of manufacture fairly falling within the scope of the appended claims either literally or under the doctrine of equivalents. This application is intended to cover any adaptations or variations of the embodiment discussed herein. Therefore, it is manifested and intended that the disclosure be limited only by the claims and the equivalents thereof.

What is claimed is:

1. A system on a chip (SOC) comprising:
a processing core; and
a cache including:
a cache instruction port;
a cache data port; and
a port utilization circuitry configured to:
selectively fetch instructions through the cache instruction port; *and*
selectively pre-fetch instructions through *only* the cache data port[; and
refrain from pre-fetching instructions through the cache instruction port].

2. The SOC of claim 1, wherein the port utilization circuitry is further configured to selectively fetch data through the cache data port and selectively pre-fetch data through the cache instruction port.

3. The SOC of claim 1, wherein the port utilization circuitry is configured to:
issue a first request for fetching a first line of instruction, the first request transmitted through the cache instruction port;
determine that the cache data port is not currently being used to fetch data; and
issue, based on determining that the cache data port is not currently being used to fetch data, a second request for pre-fetching a second line of instruction, the second request transmitted through the cache data port.

4. The SOC of claim 3, wherein the port utilization circuitry is further configured to:
issue a third request for fetching a first line of data, the third request transmitted through the cache data port;
determine that the cache instruction port is not currently being used to fetch instructions; and
issue, based on determining that the cache instruction port is not currently being used to fetch instructions, a fourth request for pre-fetching a second line of data, the fourth request transmitted through the cache instruction port.

5. The SOC of claim 3, further comprising a bridge module configured to:
transmit the first request for fetching the first line of instruction from the cache instruction port to a memory;
receive, from the memory, the first line of instruction in response to transmitting the first request to the memory; and
transmit the received first line of instruction to the cache instruction port and the processing core.

6. The SOC of claim 3, further comprising a bridge module is configured to:
transmit the second request for pre-fetching the second line of instruction from the cache data port to [the] *a* memory;
receive, from the memory, the second line of instruction in response to transmitting the second request to the memory; *and*
transmit the received second line of instruction *only* to the cache data port[; and
refrain from transmitting the second line of instruction to the processing core].

7. The SOC of claim 3, further comprising a bridge module including a bridge instruction module and a bridge data module, wherein the bridge instruction module is operatively coupled to the cache instruction port and is configured to:
transmit the first request for fetching the first line of instruction from the cache instruction port to a memory;
receive, from the memory, the first line of instruction in response to transmitting the first request to the memory; and
transmit the received first line of instruction to the cache instruction port and the processing core.

8. The SOC of claim 7, wherein the bridge data module is operatively coupled to the cache data port and is configured to:
transmit the second request for pre-fetching the second line of instruction from the cache data port to the memory;
receive, from the memory, the second line of instruction in response to transmitting the second request to the memory; *and*
transmit the received second line of instruction *only* to the cache data port[; and
refrain from transmitting the second line of instruction to the processing core].

9. The SOC of claim 1, wherein the port utilization circuitry comprises:

a cache instruction logic module including an instruction read port and an instruction pre-fetch port;

a cache data logic module including a data read port and a data pre-fetch port;

a first multiplexer module configured to selectively connect the instruction read port and the data pre-fetch port to the cache instruction port; and a second multiplexer module configured to selectively connect the data read port and the instruction fetch port to the cache data port.

10. The SOC of claim 9, wherein the cache instruction logic module is configured to:

issue a first request for fetching a first line of instruction, the first request transmitted through the instruction read port, the first multiplexer, and the cache instruction port;

determine, in response to issuing the first request, that the cache data port is not currently being used by the cache data logic module; and issue, based on determining that the cache data port is not currently being used by the cache data logic module, a second request for pre-fetching a second line of instruction, the second request transmitted through the instruction pre-fetch port, the second multiplexer, and the cache data port.

11. The SOC of claim 10, wherein the cache instruction logic module is configured to:

issue the first request for fetching the first line of instruction based on receiving a request from the processing core for instructions included in the first line of instruction;

anticipate the processing core will request instructions included in the second line of instruction, based at least in part on receiving [the] *said* request [for instructions] from the processing core *for instructions*; and issue the second request for pre-fetching the second line of instruction based at least in part on said anticipation.

12. The SOC of claim 10, wherein the cache data logic module is configured to:

receive*, from the processing core,* a request for data [from the processing core];

issue a third request for fetching a first line of data such that the data requested by the processing core is included in the first line of data, wherein the third request is transmitted through the data read port, the second multiplexer, and the cache data port;

determine that the cache instruction port is not currently being used by the cache instruction logic module; and issue, based on determining that the cache instruction port is not currently being used by the cache instruction logic module, a fourth request for pre-fetching a second line of data, the fourth request transmitted through the data pre-fetch port, the first multiplexer, and the cache instruction port.

13. A method for operating a system on a chip (SOC) comprising a processing core and a cache, the cache including a cache instruction port and a cache data port, the method comprising:

issuing a first request for fetching a first line of instruction through the cache instruction port; *and* issuing a second request for pre-fetching a second line of instruction through *only* the cache data port[; and refraining from pre-fetching any line of instructions through the cache instruction port].

14. The method of claim 13, wherein issuing the second request further comprises:

determining, in response to issuing the first request, that the cache data port is not currently being used by the cache; and issuing the second request based on determining that the cache data port is not currently being used by the cache.

15. The method of claim 13, wherein the cache includes a cache instruction logic module, a cache data logic module, a first multiplexer and a second multiplexer, wherein the cache instruction logic module includes an instruction read port and an instruction pre-fetch port, and wherein the cache data logic module includes a data read port and a data pre-fetch port;

wherein issuing the first request further comprises:

issuing the first request, by the cache instruction logic module, through the instruction read port, the first multiplexer and the cache instruction port; and wherein issuing the second request further comprises:

issuing the second request, by the cache instruction logic module, through the instruction pre-fetch port, the second multiplexer and the cache data port.

16. The method of claim 13, further comprising:

issuing a third request for fetching a first line of data through the cache data port; and issuing a fourth request for pre-fetching a second line of data through the cache instruction port.

17. The method of claim 13, wherein SOC further includes a bridge module, the method further comprising:

transmitting, by the bridge module, the first request for fetching the first line of instruction from the cache instruction port to a memory;

receiving, by the bridge module from the memory, the first line of instruction in response to transmitting the first request to the memory; and transmitting the received first line of instruction to the cache instruction port and the processing core.

18. The method of claim 13, wherein SOC further includes a bridge module, the method further comprising:

transmitting, by the bridge module, the second request for pre-fetching the second line of instruction from the cache data port to a memory;

receiving, by the bridge module from the memory, the second line of instruction in response to transmitting the second request to the memory; and transmitting, by the bridge module, the received second line of instruction to the cache data port.

[19. The method of claim 18, further comprising:

refraining, by the bridge module, from transmitting the second line of instruction to the processing core.]

20. The method of claim 13, further comprising:

issuing the first request and the second request substantially simultaneously or in an over-lapping manner.

*21. A system on a chip (SOC) comprising:*

*a processing core;*

*a first wired communication link configured to selectively fetch data; and*

*a second wired communication link configured to (i) selectively fetch instructions, and (ii) selectively pre-fetch data while the second wired communication link is not fetching instructions, the second wired communication link being coupled to a cache instruction port, wherein the cache instruction port pre-fetches data through only the cache instruction port via the second wired communication link.*

*22. The SOC of claim 21, wherein the first wired communication link is further configured to selectively pre-fetch instructions while the first wired communication link is not fetching data.*

*23. The SOC of claim 21, further comprising:*

*a cache comprising (i) a cache data port, the first wired communication link being coupled to the cache data port, and (ii) the cache instruction port.*

*24. The SOC of claim 23, wherein the cache further comprises:*

*a port utilization circuitry configured to control the cache such that*

*(A) the cache data port selectively fetches data via the first wired communication link, and*

*(B) the cache instruction port (i) selectively fetches instructions via the second wired communication link, and (ii) selectively pre-fetches data via the second wired communication link, while the second wired communication link is not selectively fetching instructions.*

*25. The SOC of claim 24, wherein the port utilization circuitry is further configured to control the cache such that (A) the cache data port selectively fetches data via the first wired communication link and (B) the cache instruction port selectively pre-fetches data via the second wired communication link.*

*26. The SOC of claim 24, wherein the port utilization circuitry is configured to:*

*issue a first request for fetching a first line of instruction, the first request transmitted through the cache instruction port and the second wired communication link;*

*determine that the cache data port is not currently being used to fetch data; and*

*issue, based on determining that the cache data port is not currently being used to fetch data, a second request for pre-fetching a second line of instruction, the second request transmitted through the cache data port and the first wired communication link.*

*27. The SOC of claim 26, wherein the port utilization circuitry is further configured to:*

*issue a third request for fetching a first line of data, the third request transmitted through the cache data port and the first wired communication link;*

*determine that the cache instruction port is not currently being used to fetch instructions; and*

*issue, based on determining that the cache instruction port is not currently being used to fetch instructions, a fourth request for pre-fetching a second line of data, the fourth request transmitted through the cache instruction port and the second wired communication link.*

*28. The SOC of claim 27, further comprising a bridge module configured to:*

*transmit the first request for fetching the first line of instruction from the cache instruction port to a memory;*

*receive, from the memory, the first line of instruction in response to transmitting the first request to the memory; and*

*transmit the received first line of instruction to the cache instruction port and the processing core.*

*29. The SOC of claim 27, further comprising a bridge module configured to:*

*transmit the second request for pre-fetching the second line of instruction from the cache data port to the memory;*

*receive, from the memory, the second line of instruction in response to transmitting the second request to the memory; and*

*transmit the received second line of instruction only to the cache data port.*

*30. The SOC of claim 27, further comprising a bridge module including a bridge instruction module and a bridge data module, wherein the bridge instruction module is operatively coupled to the cache instruction port, the bridge instruction module configured to:*

*transmit the first request for fetching the first line of instruction from the cache instruction port to a memory;*

*receive, from the memory, the first line of instruction in response to transmitting the first request to the memory; and*

*transmit the received first line of instruction to the cache instruction port and to the processing core.*

*31. The SOC of claim 30, wherein the bridge data module is operatively coupled to the cache data port, the bridge data module configured to:*

*transmit the second request for pre-fetching the second line of instruction from the cache data port to the memory;*

*receive, from the memory, the second line of instruction in response to transmitting the second request to the memory; and*

*transmit the received second line of instruction only to the cache data port.*

*32. The SOC of claim 24, wherein the port utilization circuitry comprises:*

*a cache instruction logic module including an instruction read port and an instruction pre-fetch port;*

*a cache data logic module including a data read port and a data pre-fetch port;*

*a first multiplexer module configured to selectively connect the instruction read port and the data pre-fetch port to the cache instruction port; and*

*a second multiplexer module configured to selectively connect the data read port and the instruction fetch port to the cache data port.*

*33. The SOC of claim 32, wherein the cache instruction logic module is configured to:*

*issue a first request for fetching a first line of instruction, the first request transmitted through the instruction read port, the first multiplexer, the cache instruction port, and the second wired communication link;*

*determine, in response to issuing the first request, that the cache data port is not currently being used by the cache data logic module; and*

*issue, based on determining that the cache data port is not currently being used by the cache data logic module, a second request for pre-fetching a second line of instruction, the second request transmitted through the instruction pre-fetch port, the second multiplexer, the cache data port, and the first wired communication link.*

*34. The SOC of claim 33, wherein the cache instruction logic module is configured to:*

*issue the first request for fetching the first line of instruction based on receiving a request from the processing core for instructions included in the first line of instruction;*

*anticipate the processing core will request instructions included in the second line of instruction, based at least in part on receiving the request for instructions from the processing core; and*

*issue the second request for pre-fetching the second line of instruction based at least in part on said anticipation.*

*35. The SOC of claim 33, wherein the cache data logic module is configured to:*

*receive a request for data from the processing core;*

*issue a third request for fetching a first line of data such that the data requested by the processing core is included in the first line of data, wherein the third request is transmitted through the data read port, the second multiplexer, the cache data port, and the first wired communication link;*

*determine that the cache instruction port is not currently being used by the cache instruction logic module; and*

*issue, based on determining that the cache instruction port is not currently being used by the cache instruction logic module, a fourth request for pre-fetching a second line of data, the fourth request transmitted through the data pre-fetch port, the first multiplexer, the cache instruction port, and the second wired communication link.*

*36. A method for operating a system on a chip (SOC) comprising a processing core, the method comprising:*

*selectively fetching data via a first wired communication link;*

*selectively fetching instructions via a second wired communication link;*

*while instructions are not being fetched via the second wired communication link, selectively pre-fetching data via only the second wired communication link, the second wired communication link being coupled to a cache instruction port.*

*37. The method of claim 36, further comprising:*

*while data are not being fetched via the first wired communication link, selectively pre-fetching instructions via the first wired communication link.*

*38. The method of claim 36, wherein the SOC comprises a cache, the cache including a cache instruction port and a cache data port, the method further comprising:*

*issuing a first request for fetching a first line of instruction through the cache instruction port and the second wired communication link;*

*issuing a second request for pre-fetching a second line of instruction through only the cache data port and the first wired communication link.*

*39. The method of claim 38, wherein issuing the second request further comprises:*

*determining, in response to issuing the first request, that the cache data port is not currently being used by the cache; and*

*issuing the second request based on determining that the cache data port is not currently being used by the cache.*

*40. The method of claim 38, wherein the cache includes a cache instruction logic module, a cache data logic module, a first multiplexer and a second multiplexer, wherein the cache instruction logic module includes an instruction read port and an instruction pre-fetch port, and wherein the cache data logic module includes a data read port and a data pre-fetch port;*

*wherein issuing the first request further comprises:*

*issuing the first request, by the cache instruction logic module, through the instruction read port, the first multiplexer, the cache instruction port, and the second wired communication link; and*

*wherein issuing the second request further comprises:*

*issuing the second request, by the cache instruction logic module, through the instruction pre-fetch port, the second multiplexer, the cache data port, and the first wired communication link.*

*41. The method of claim 38, further comprising:*

*issuing a third request for fetching a first line of data through the cache data port and the first wired communication link; and*

*issuing a fourth request for pre-fetching a second line of data through the cache instruction port and the second wired communication link.*

*42. The method of claim 38, wherein SOC further includes a bridge module, the method further comprising:*

*transmitting, by the bridge module, the first request for fetching the first line of instruction from the cache instruction port to a memory;*

*receiving, by the bridge module from the memory, the first line of instruction in response to transmitting the first request to the memory; and*

*transmitting the received first line of instruction to the cache instruction port and the processing core.*

*43. The method of claim 38, wherein SOC further includes a bridge module, the method further comprising:*

*transmitting, by the bridge module, the second request for pre-fetching the second line of instruction from the cache data port to a memory;*

*receiving, by the bridge module from the memory, the second line of instruction in response to transmitting the second request to the memory; and*

*transmitting, by the bridge module, the received second line of instruction to the cache data port.*

*44. The method of claim 38, further comprising:*

*issuing the first request and the second request substantially simultaneously or in an over-lapping manner.*

* * * * *